United States Patent
Roseillier

(10) Patent No.: US 8,636,356 B2
(45) Date of Patent: Jan. 28, 2014

(54) GLASSES WITH STEM LOCKS

(75) Inventor: Nicolas Roseillier, Los Angeles, CA (US)

(73) Assignee: Tumi, Inc., South Plainfied, NJ (US)

( * ) Notice: Subject to any disclaimer, the term of this patent is extended or adjusted under 35 U.S.C. 154(b) by 0 days.

(21) Appl. No.: 13/171,966

(22) Filed: Jun. 29, 2011

(65) Prior Publication Data

US 2012/0008086 A1    Jan. 12, 2012

Related U.S. Application Data

(60) Provisional application No. 61/361,902, filed on Jul. 6, 2010.

(51) Int. Cl.
*G02C 5/08*  (2006.01)
*G02C 5/00*  (2006.01)
*G02C 5/12*  (2006.01)

(52) U.S. Cl.
CPC . *G02C 5/006* (2013.01); *G02C 5/12* (2013.01)
USPC ............................... 351/63; 351/136

(58) Field of Classification Search
CPC .................................. G02C 5/006; G02C 5/12
USPC .............................. 351/41, 63, 111–123, 136

See application file for complete search history.

(56) References Cited

U.S. PATENT DOCUMENTS

| | | | |
|---|---|---|---|
| 4,050,785 A * | 9/1977 | Auge | 351/120 |
| 4,309,086 A | 1/1982 | Lhospice | |
| 6,779,887 B2 * | 8/2004 | Meiler | 351/153 |
| 2003/0020866 A1 | 1/2003 | Asano | |
| 2006/0279692 A1 | 12/2006 | Bruck | |
| 2009/0190088 A1 * | 7/2009 | Strobel | 351/63 |

OTHER PUBLICATIONS

International Search Report and Written Opinion for PCT/US2011/042389, dated Nov. 14, 2011.

* cited by examiner

*Primary Examiner* — Huy K Mai
(74) *Attorney, Agent, or Firm* — Jon Fallon, Esq.

(57) ABSTRACT

An eye wear system comprising a frame configured to receive at least one lens, with stems pivotably coupled to the frame, wherein stems have a first portion and a second portion, and a first, i.e. open, orientation disposed generally perpendicular to the frame, and a second, i.e. collapsed, orientation disposed generally parallel to the frame. The nose pads, which can be integrally formed with the frame, form at least part of an opening configured to receive the first portion of the stem to releasably secure the stem in the second, or collapsed, orientation.

18 Claims, 2 Drawing Sheets

GLASSES WITH STEM LOCKS

CROSS REFERENCE TO RELATED APPLICATION

This application claims the benefit of U.S. Provisional Application Ser. No. 61/361,902 filed Jul. 6, 2010, which is hereby incorporated by reference in its entirety.

BACKGROUND OF THE DISCLOSED SUBJECT MATTER

1. Field of the Disclosed Subject Matter

The disclosed subject matter relates to eye wear systems and methods of use. Particularly, the present disclosed subject matter is directed to a method and device for collapsible eyewear which can be securely, and releasably, disposed in the folded or collapsed configuration.

2. Description of Related Art

Various methods and designs of eyewear have been developed. Conventional designs of prior art reading glasses provide a separate storage compartment to maintain the glasses in the closed or collapsed configuration, as well as to prevent the stems of the glasses from becoming damaged while not in use.

However, such a compartment is neither convenient nor easy to access quickly when a user needs to view written material. As a result, glasses are frequently folded into a collapsed orientation small enough to be worn in a pants or shirt pocket and are not stowed in the compartment for protection. Unfortunately, the glasses are subsequently scratched or otherwise damaged since there is little protection for the lenses. Also, the frames are often damaged, especially at the mechanical joints by the frequent contact made to both the lenses and folding frames. When worn in a pocket, the frames can be damaged from inadvertent collisions with environmental hazards such as office furniture, automobile doors, and walls, etc.

Although such conventional methods and systems generally have been considered satisfactory for their intended purpose, there remains a need for an eye wear system which can be securely, and releasably, disposed in the folded or collapsed configuration.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes an eye wear system that provides a secure and releasable stem locking mechanism. In an exemplary embodiment, the eye wear system comprises a frame configured to receive at least one lens, and at least one stem pivotably coupled to the frame, wherein the at least one stem has a first portion and a second portion, the at least one stem having a first orientation disposed generally perpendicular to the frame, and a second orientation disposed generally parallel to the frame. At least one nose pad is disposed on the frame, wherein the at least one nose pad includes an opening configured to receive the first portion of the at least one stem to releasably secure the at least one stem in the second orientation.

In one embodiment, the nose pad and the frame are an integral single-piece structure. Additionally, the opening is configured as a slot or channel which extends in a plurality of planes. For example, the slot or channel can extend a first distance generally perpendicular to the frame and a second distance generally parallel to the frame. In an exemplary embodiment the second distance is greater than the first distance. Furthermore, the opening can be disposed proximate a bottom of the nose pad.

In operation, the first and second stems are disposed in an overlapping manner when in the second orientation, and the second portion of the stem is configured to engage the ear of a user when in the first orientation. Additionally, the frame and nose pads may be made of plastic, carbon graphite, acetate, or combinations thereof. Further, at least one portion of the stem may be made of a material having shape-memory characteristics. For example, the first portion of the stem can be made of titanium or stainless steel. Additionally, the second portion of the stem can be made of carbon. The stem can be coupled to the frame by a hinge. Alternatively, the stem can be coupled to the frame by a spring. Further, the stem is maintained in a generally non-linear shape when in the second orientation.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION OF AN EXEMPLARY EMBODIMENT

Figure 1:
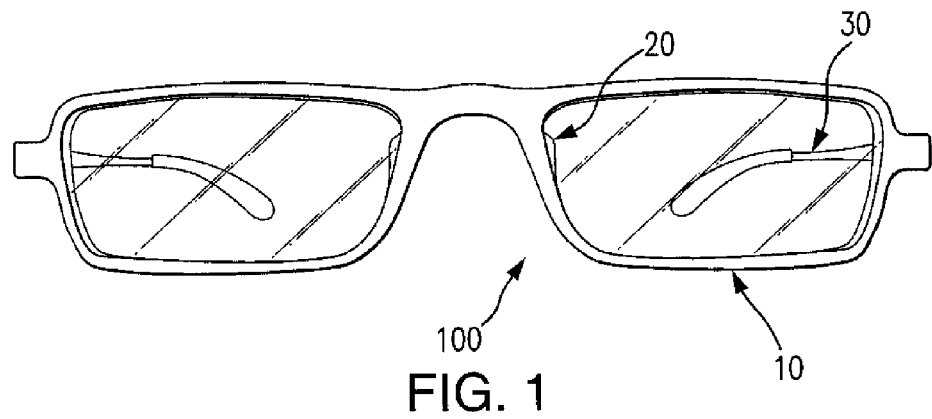
FIG. 1 is a schematic representation of a front view of an exemplary eye wear system in accordance with the disclosed subject matter.
Figure 2:
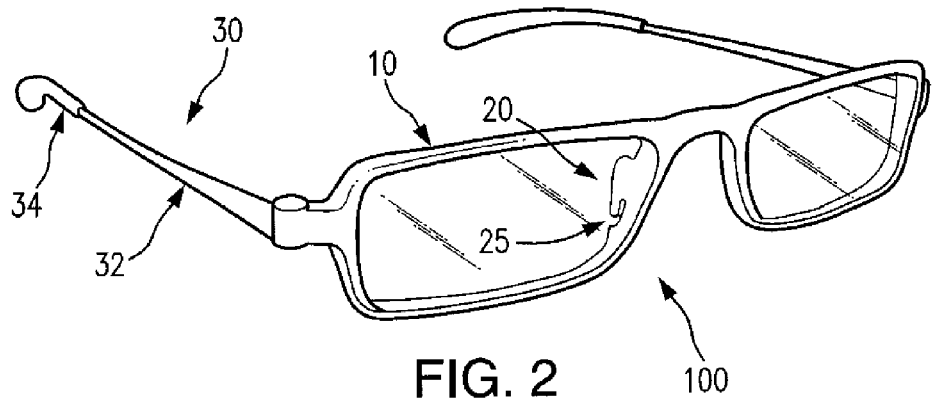
FIG. 2 is a schematic view of a front-perspective view of the eye wear system of FIG. 1.

Reference will now be made in detail to an exemplary embodiment of the disclosed subject matter, an illustration of which is provided in the accompanying drawings. The structure and corresponding method of the disclosed subject matter will be described in conjunction with the detailed description of the system.

The methods and structures presented herein can be used for eye wear, such as prescription reading glasses, sunglasses, non-prescription magnification glasses, etc., having stems which can be securely, and releasably, positioned in a closed or collapsed configuration. For purpose of explanation and illustration, and not limitation, an exemplary embodiment of the eye wear system in accordance with the disclosed subject matter is shown in FIGS. 1-5 and is designated generally by reference character 100.

Particularly, the disclosed subject matter is directed towards eye wear having stems which can be securely, and releasably, received within the nose pad to maintain the stems in a closed or collapsed configuration. According to an aspect of the disclosed subject matter, the frames 10 can be provided in any size and shape as so desired to accommodate a variety of lens types. Additionally, a pair of nose pads 20 are coupled to the frames and configured to rest against the bridge of the user's nose, as known in the art. Although the exemplary embodiment of FIGS. 1-5 depict the nose pad 20 as being formed integrally with the frame 20, alternative nose pad designs, e.g., separate members which are mechanically coupled to the frame 10 can be employed, if so desired. Additionally, a pair of stems 30 are pivotably coupled to the frame 10 such that the stems have a first, i.e. open, orientation which is generally perpendicular to the frame 10, and a second, i.e. closed, orientation which is generally parallel to the frame 10. The stems 30 and frame 10 can be joined by a hinge 40, or alternatively, a spring of sufficient stiffness to allow for repeated transition between the open and closed configurations. Further, the frames 10 and nose pad 20 can be formed from any material that provides suitable strength characteristics. For example, the frames 10 and nose pad 20 can be formed of plastic and carbon graphite.

Figure 3:
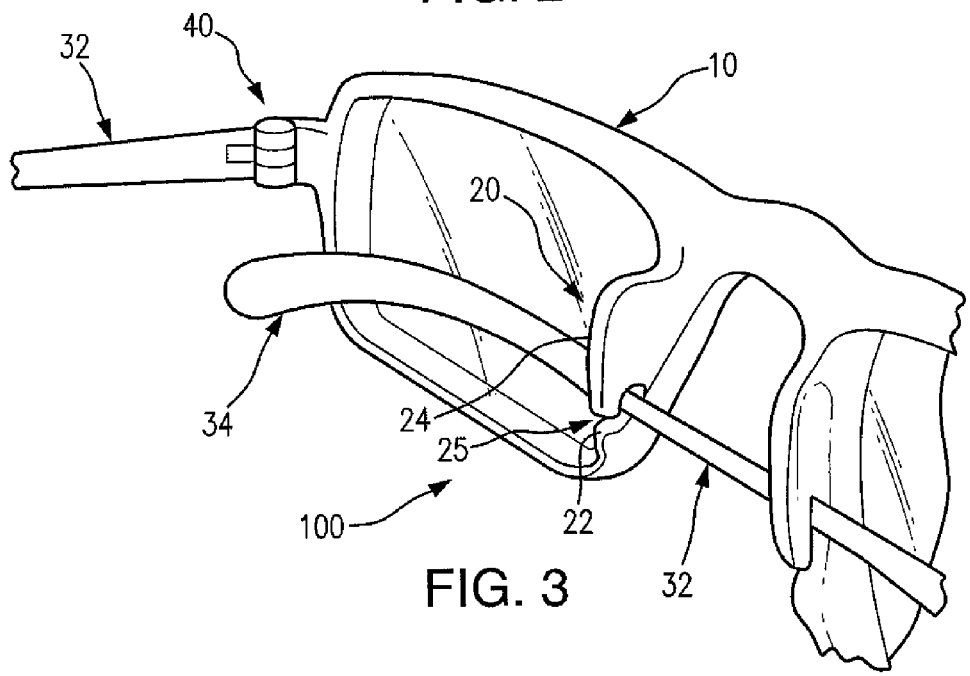
FIG. 3 is a schematic view of a rear-perspective view of the eye wear system of FIG. 1, depicting one stem in an open configuration and one stem in a collapsed configuration.
Figure 4:
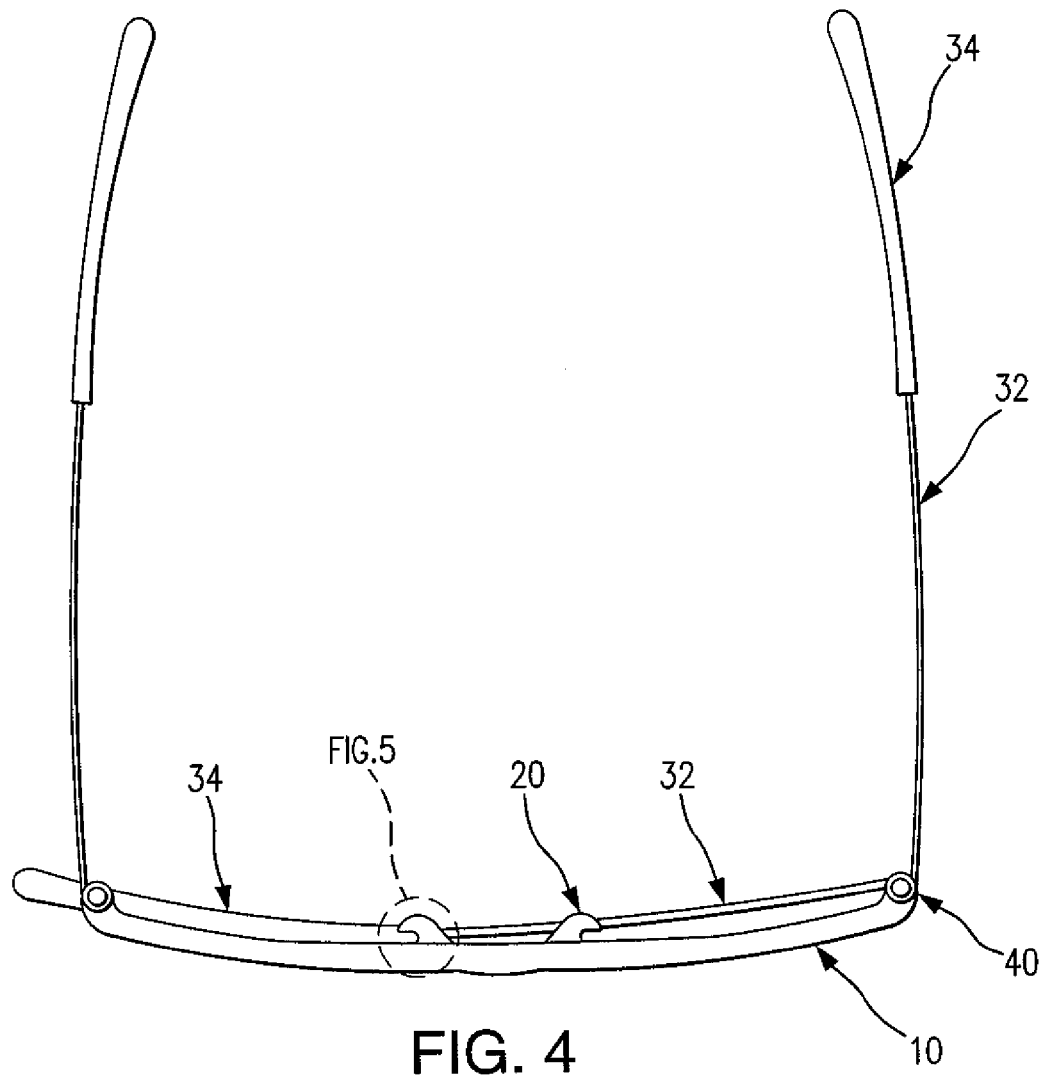
FIG. 4 is a schematic representation of a top view of the eye wear system of FIG. 1, depicting two stems in an open configuration and one stem in a collapsed configuration.
Figure 5:
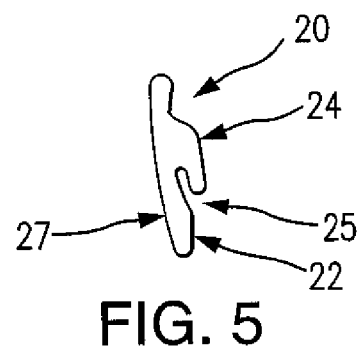
FIG. 5 is a schematic representation of a side view of the nose pad and opening formed therein.

In accordance with an aspect of the disclosed subject matter, the nose pad 20 is formed with an opening 25 configured to receive the stems 30, when in the closed configuration. Additionally, or alternatively, the nose pad 25 can be formed to at least partially define an opening 25 between the frame 10 and the nose pad 20. The opening 25 serves as a locking feature which securely retains the stems 30 proximate the frame 10, thereby reducing or eliminating the risk of snag or damage to the stems 30. Additionally, and as illustrated in FIG. 3, the opening 25 is configured as a slot or channel that extends in a plurality of planes. In other words, the slot or channel forming the opening 25 extends a first distance generally perpendicular to the frame and a second distance generally parallel to the frame. As shown in FIGS. 3 and 5, the slot or channel forming the opening 25 extends a greater distance parallel to the frame 10 than the distance perpendicular to the frame 10. Also, the opening 25 is disposed proximate a bottom of the nose pad 20. As shown in FIGS. 3-4, the opening 25 is defined between a lower portion 22, and upper portion 24 of the nose pad.

The stems 30 have a first, i.e. temple 32, portion and a second, i.e. tip 34, portion wherein the temple portion is coupled to the hinge and the tip portion engages the user's ear when in use. In one embodiment, the first and second portions of the stem can be an integral single-piece structure. The stem can be made of any material which provides sufficient elasticity or shape memory characteristics, as described in further detail below. For example, the temple portion 32 of the stem can be formed of titanium or steel, and the tip portion 34 can be formed of plastic or acetate.

In operation, when a user removes the eye wear the stems 30 can be folded into the closed or collapsed configuration wherein the user applies a moderate force to the temple portion 32 of the stem to advance the stem 30 into the opening 25. The user applies the force in a generally inward and upward direction with respect to the frame 10. In this regard, the lower portion 22 of the nose pad can serve as a guide or ramp in which the stems 30 are slid against when converting the eye wear into the closed configuration. In the exemplary embodiment, the lower portion 22 of the nose pad is curved allowing it to function as the guide or ramp 27.

This guide feature of the opening 25 ensures proper positioning of the stem, as well as a tactile confirmation to the user that the stems are securely received within the nose pad. As shown in FIG. 4, the force applied causes the stem 30 to bend or deflect into a non-planar configuration. As discussed above, the stems 30 can be formed of a material with sufficient elasticity, or shape memory, which provides a bias to restore the stems to their original shape. This bias force causes the stem 30 to abut against the upper portion 24 of the nose pad to securely retain the stem in the closed configuration. Additionally, the bent or curved shape of the stems, provided via the retention within the nose pad 20, serve to reduce the profile of the eye wear when in the closed configuration, thereby facilitating the ease of storage and/or transport of the eye wear. Furthermore, the two stems 30 are disposed in an overlapping manner when positioned in the closed configuration. Additionally, the hinge 40 can be located proximate the frame 10 in order to further reduce the profile of the eye wear system.

While the disclosed subject matter is described herein in terms of certain exemplary embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. An eye wear system comprising:
    a frame configured to receive at least one lens;
    at least one stem pivotably coupled to the frame, the at least one stem having a first portion and a second portion, the at least one stem having a first orientation disposed generally perpendicular to the frame, and a second orientation disposed generally parallel to the frame;
    at least one nose pad disposed on the frame;
    wherein the at least one nose pad forms at least part of an opening configured to receive the first portion of the at least one stem to releasably secure the at least one stem in the second orientation;
    wherein the opening is curved to help guide the stem upwardly into the opening; and wherein nose pad is adapted to maintain the stem in the opening until the stem is depressed downwardly and out of the opening.

2. The eye wear system of claim 1, wherein the nose pad and the frame are an integral single-piece structure.

3. The eye wear system of claim 1, wherein the opening is configured as a slot.

4. The eye wear system of claim 3, wherein the slot extends in a plurality of planes.

5. The eye wear system of claim 4, wherein the slot extends a first distance generally perpendicular to the frame and a second distance generally parallel to the frame.

6. The eye wear system of claim 5, wherein the second distance is greater than the first distance.

7. The eye wear system of claim 1, wherein the opening is disposed proximate a bottom of the nose pad.

8. The eye wear system of claim 1, wherein a first and second stem are disposed in an overlapping manner when in the second orientation.

9. The eye wear system of claim 1, wherein the frame and at least one nose pad is made of plastic, carbon graphite, acetate, or combinations thereof.

10. The eye wear system of claim 1, wherein at least one portion of the at least one stem is made of a material having shape-memory characteristics.

11. The eye wear system of claim 1, wherein the first portion of the stem is made of titanium or stainless steel.

12. The eye wear system of claim 1, wherein the second portion of the stem is made of plastic or acetate.

13. The eye wear system of claim 1, wherein the second portion of the stem is configured to engage the ear of a user when in the first orientation.

14. The eye wear system of claim 1, wherein the at least one stem is coupled to the frame by a hinge.

15. The eye wear system of claim 1, wherein the at least one stem is coupled to the frame by a spring.

16. The eye wear system of claim 1, wherein the at least one stem is maintained in a generally non-linear shape when in the second orientation.

17. The eye wear system of claim 3, wherein a portion of the frame comprises a side of the slot and wherein the frame is curved to help guide the stem into the second orientation.

18. The eye wear system of claim 1, wherein the first and second portions of the stem are an integral single-piece structure.

* * * * *